US011830720B2

(12) United States Patent
March

(10) Patent No.: US 11,830,720 B2
(45) Date of Patent: Nov. 28, 2023

(54) PLASMA LAMP AS A RADIATION SOURCE IN AN APPARATUS FOR ARTIFICIAL WEATHERING

(71) Applicant: ATLAS Material Testing Technology GmbH, Linsengericht-Altenhaßlau (DE)

(72) Inventor: Peter March, Frankfurt a. Main (DE)

(73) Assignee: ATLAS MATERIAL TESTING TECHNOLOGY GMBH, Linsengericht-Altenhasslau (DE)

( * ) Notice: Subject to any disclaimer, the term of this patent is extended or adjusted under 35 U.S.C. 154(b) by 43 days.

(21) Appl. No.: 17/540,001

(22) Filed: Dec. 1, 2021

(65) Prior Publication Data

US 2022/0230868 A1 Jul. 21, 2022

(30) Foreign Application Priority Data

Jan. 19, 2021 (EP) .................................... 21152377

(51) Int. Cl.
*H01J 65/04* (2006.01)
*F21S 8/00* (2006.01)
*G01N 1/44* (2006.01)
*H01J 61/20* (2006.01)

(52) U.S. Cl.
CPC ............ *H01J 65/042* (2013.01); *F21S 8/006* (2013.01); *G01N 1/44* (2013.01); *H01J 61/20* (2013.01)

(58) Field of Classification Search
CPC .......... H01J 65/042; H01J 61/20; F21S 8/006; G01N 1/44
USPC ..................................................... 250/492.1
See application file for complete search history.

(56) References Cited

U.S. PATENT DOCUMENTS

| | | | |
|---|---|---|---|
| 5,138,892 A * | 8/1992 | Suga | G01N 17/004 374/57 |
| 5,404,076 A | 4/1995 | Dolan et al. | |
| 6,107,752 A | 8/2000 | Palmer et al. | |
| 6,465,959 B1 | 10/2002 | Tian et al. | |
| 6,586,756 B1 | 7/2003 | Kopperl et al. | |
| 9,063,050 B2 * | 6/2015 | Suga | G01N 17/004 |
| 9,258,927 B2 * | 2/2016 | Källmark | G05D 23/125 |
| 2002/0030453 A1 | 3/2002 | Kirkpatrick et al. | |

(Continued)

FOREIGN PATENT DOCUMENTS

| CN | 201084702 Y | 7/2008 |
|---|---|---|
| EP | 1876633 A1 | 1/2008 |

(Continued)

OTHER PUBLICATIONS

European Search Report cited in EP21152377 dated Jul. 20, 2021, 13 pages.

(Continued)

*Primary Examiner* — Christopher M Raabe
(74) *Attorney, Agent, or Firm* — Cooper Legal Group, LLC

(57) ABSTRACT

An apparatus for artificial weathering or lightfastness testing of samples or for simulating solar radiation, the apparatus comprises a weathering chamber, an electrodeless lamp provided in the weathering chamber and comprising a bulb filled with a composition that emits light when in a plasma state, and a radio frequency source being arranged so that it radiate a radio frequency field into the bulb to generate a luminous plasma for emitting a radiation comprising spectral emission characteristics similar to natural solar radiation.

12 Claims, 4 Drawing Sheets

(56) References Cited

U.S. PATENT DOCUMENTS

| | | | | |
|---|---|---|---|---|
| 2005/0092114 A1* | 5/2005 | Schonlein | ............. | G01N 17/00 |
| | | | | 73/866 |
| 2010/0283389 A1* | 11/2010 | Frederick | ............. | H01J 65/044 |
| | | | | 315/39 |
| 2011/0204791 A1* | 8/2011 | Doughty | ............. | H01J 65/044 |
| | | | | 315/248 |
| 2014/0125225 A1 | 5/2014 | Calame et al. | | |

FOREIGN PATENT DOCUMENTS

| JP | 2006526781 A | 11/2006 |
|---|---|---|
| JP | 2010019841 A | 1/2010 |
| JP | 2014509060 A | 4/2014 |
| KR | 101936946 B1 | 1/2019 |

OTHER PUBLICATIONS

Notice of Rejection cited in JP 2022-003683 dated May 30, 2023, 7 pages.

* cited by examiner

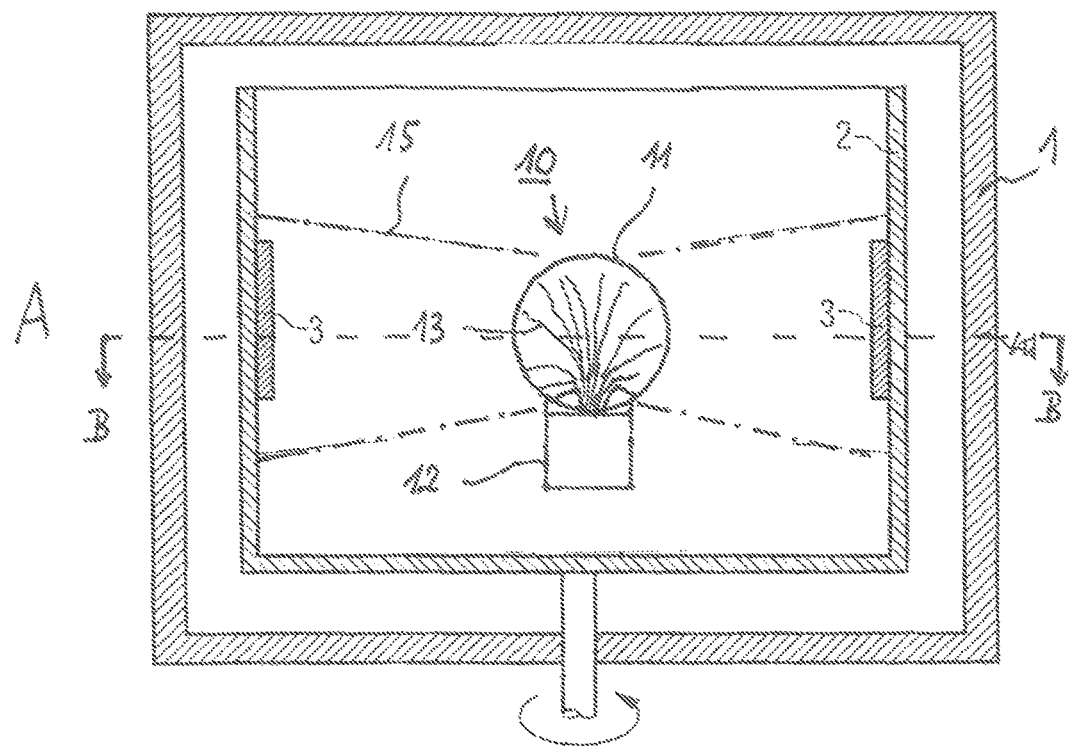
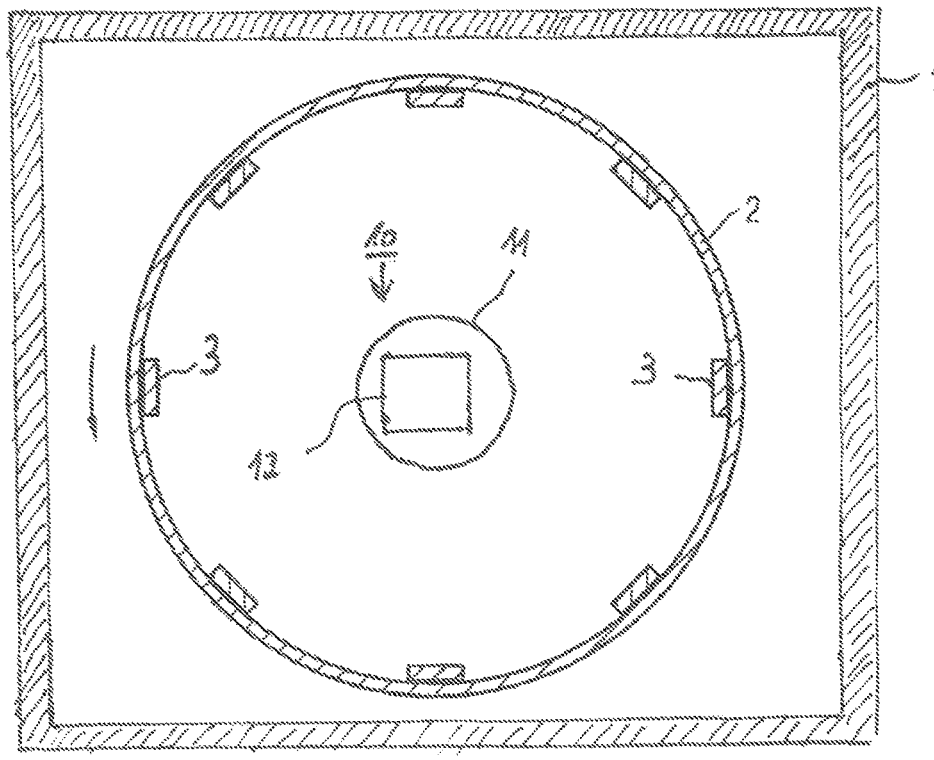

Fig. 4
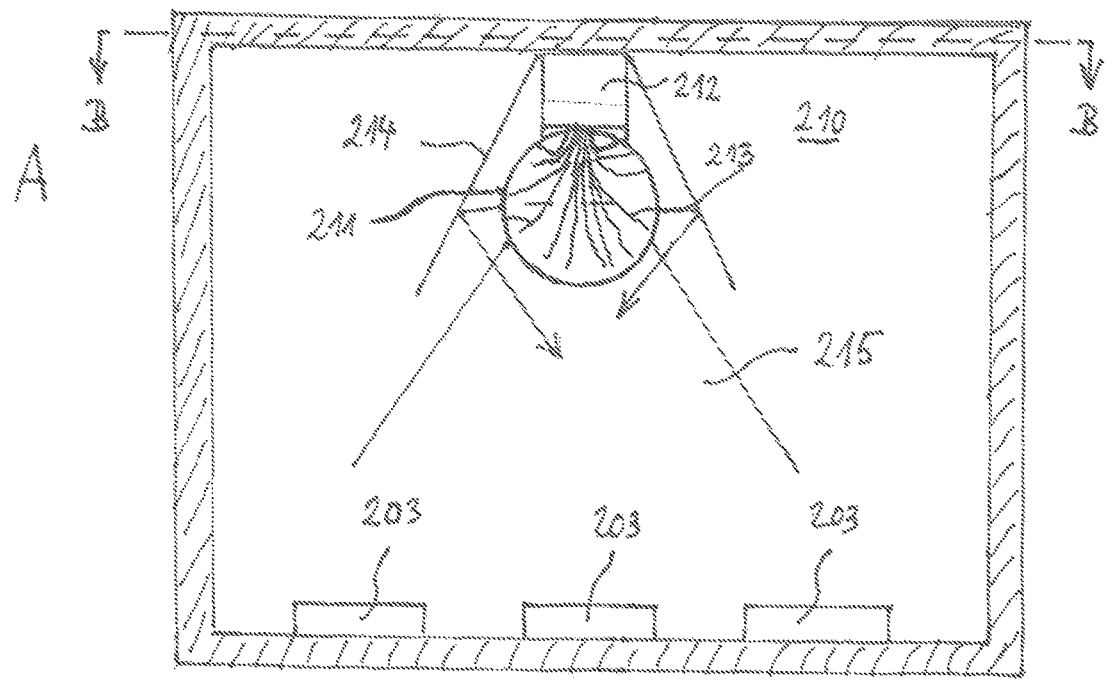
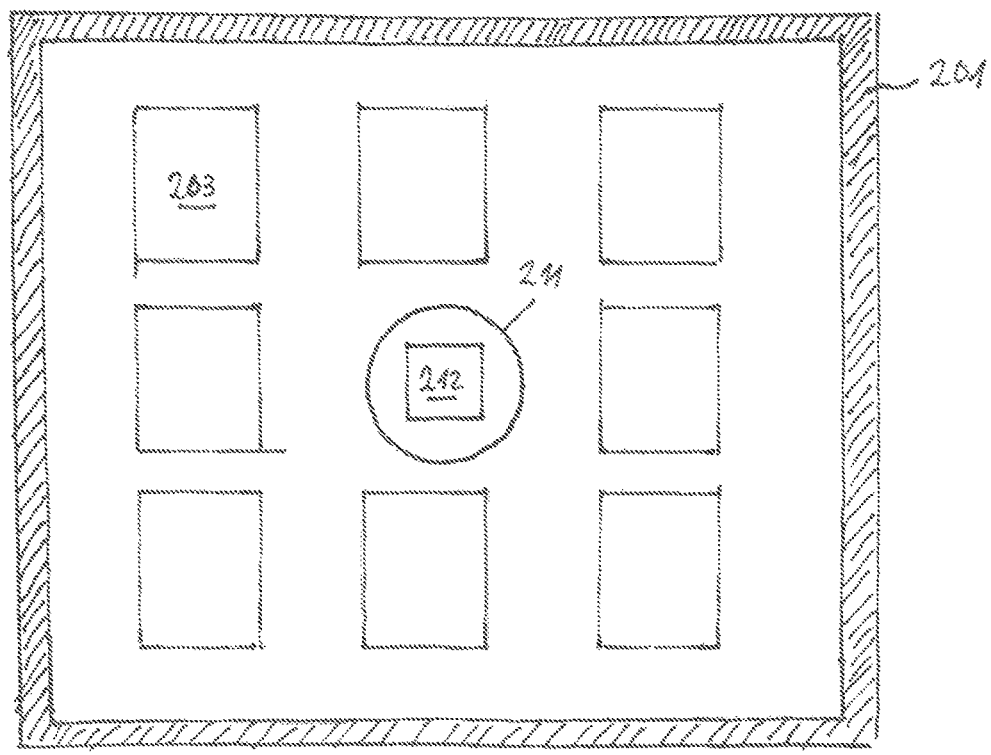

PLASMA LAMP AS A RADIATION SOURCE IN AN APPARATUS FOR ARTIFICIAL WEATHERING

RELATED APPLICATIONS

The present disclosure claims priority to European Patent Application 21152377.4, filed on Jan. 19, 2021, which is incorporated herein by reference.

TECHNICAL FIELD

The present disclosure relates to an apparatus for artificial weathering, an apparatus for lightfastness testing, or a sun light simulator apparatus, such apparatus comprising as a light source an electrodeless discharge lamp in which a luminous plasma is generated by radio frequency or microwave energy for providing visible and/or infrared and/or UV radiation.

BACKGROUND

Artificial weathering or sunlight simulator apparatuses are intended to estimate the lifetime of materials which are constantly exposed to natural weather conditions during their use, and which therefore suffer from climatic effects such as sunlight, solar heat, moisture and the like. In order to obtain a good simulation of the natural weathering situation, the spectral energy distribution of the light generated in the device should correspond as closely as possible to that of natural solar radiation, for which reason xenon radiators are used as radiation sources in such devices. An accelerated ageing test of the materials is essentially achieved by much more intense irradiation of the samples compared with natural conditions, which speeds up the ageing of the samples. In this way, a prediction of the long-term ageing of a material sample can be made after a comparatively short time.

A large number of the samples studied in artificial weathering devices consist of polymeric materials. Their deterioration due to weathering is essentially caused by the UV component of solar radiation. The primary photochemical processes which take place during this, that is to say the absorption of photons and the generation of excited states or free radicals, are independent of temperature. The subsequent reaction steps with the polymers or additives, however, may be temperature-dependent so that the observed ageing of the materials is also temperature-dependent.

A xenon lamp is normally used as the radiation source in the weathering testers of the prior art. Although such a lamp is known to be able to simulate the solar spectrum very well, the emitted radiation nevertheless has a relatively high spectral component in the infrared spectral range, which needs to be suppressed by filters in order to prevent excessive heating of the samples. Furthermore, a commercially available xenon radiation source only has a lifetime of about 1500 hours.

A halogen lamp may also be used as the radiation source, although this has the disadvantage that it is not adjustable, or can only be adjusted to a minor extent. The same applies to fluorescent lamps, which likewise have already been used as radiation sources in weathering testers and which also have the disadvantage of a relatively short lifetime.

For these and other reasons there is a need for the present disclosure.

SUMMARY

An aspect of the present disclosure relates to an apparatus for artificial weathering or lightfastness testing of samples or for simulating solar radiation, the apparatus comprising a holder configured to hold samples to be analyzed, and an electrodeless lamp comprising a bulb filled with a composition that emits light when in a plasma state, and a radio frequency source being arranged so that it radiate a radio frequency field into the bulb to generate a luminous plasma for emitting a radiation comprising spectral emission characteristics similar to natural solar radiation.

High intensity discharge lamps (HID lamps) are widely employed in lighting thanks to their excellent luminous efficiency and color rendition. They consist, in many instances, of a transparent envelope containing a gas that is brought in a luminous state by an electric discharge flowing across two electrodes. An electrodeless lamp is a form of lamp in which a transparent bulb, filled with an appropriate composition, is heated by radio frequency or microwave energy.

Electrodeless lamps tend to exhibit a longer lifetime and maintain better their spectral characteristics along their life than electrode discharge lamps. While requiring a radio frequency power supply, they use bulbs of very simple structure without costly glass-metal interfaces. Moreover, the absents of electrodes allows for a much greater variety of light-generating substances to be used than in traditional discharge lamps. Sulphur, Selenium, Tellurium, among others, are popular fills whose use is limited to electrodeless lamps, because they are not chemically compatible with metal electrodes.

Electrodeless lamps are an interesting alternative to conventional HID lamps in general lighting application, and in all fields in which high efficiency and excellent spectral characteristics are called for like photography, movie recording, agriculture, testing of photovoltaic equipment, and artificial weathering, among others.

In an embodiment which will be shown and described below, the bulb comprises a spherical form, wherein the radio frequency source is arranged to radiate the radio frequency field into the bulb so that radio frequency field optimally fills the space within the bulb. In particular, the radio frequency source can be comprised of a magnetron emitting microwave radiation in the open 2.45 GHz band.

According to an example of the electrodeless lamp, the lamp further comprises an electrically conductive enclosure which surrounds the bulb. The enclosure can be realized by an electrically conductive sheet, layer, or mesh. In case of a sheet or layer it is supported by a suitably transparent, translucent, or light-transmitting substrate on which a thin electrically conductive layer is deposited. According to a further example thereof, the enclosure is connected with the radio frequency source. More specifically, the radio frequency source comprises an output terminal in the form of a waveguide, wherein the enclosure is connected to the waveguide. As will be seen and described in embodiments further below, the waveguide may comprise a central conductor and an outer sleeve-like conductor surrounding the central conductor, both the central conductor and the outer sleeve-like conductor extending from a main surface of the radio frequency source in the direction of the bulb. The enclosure can be connected with the outer sleeve-like conductor. In one example, a dielectric rod can be connected between the central conductor and an outer wall of the bulb and in another example there is an empty space provided between the central conductor and the outer wall of the bulb, in particular no element like a dielectric rod is provided between them.

According to an example of the lamp, the construction of the lamp is such that in normal operation of the lamp any formation of standing waves of the radiated electric fields does not take place.

According to an example of the lamp, the lamp does not contain any reflecting walls outside of the electrically conducting enclosure, in particular no reflecting walls which may form a cavity causing the build-up of standing waves between the reflecting walls in normal operation of the lamp.

According to an example of the apparatus, the apparatus comprises an additional light concentrator in which the lamp may be disposed. The light concentrator may have reflective walls in order to concentrate the light generated in the bulb into a beam of a desired aperture which may then be directed in a desired manner onto specific samples to be examined.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

The present disclosure will be explained in more detail below with reference to exemplary embodiments in conjunction with the figures of the drawing, in which:

FIG. 1 comprises FIGS. 1A and 1B and shows a vertical cross-sectional view (A) and a horizontal cross-sectional down view taken at line B-B of FIG. 1A (B) of an apparatus for artificial weathering, the apparatus being of the dynamic type with rotating samples.

FIG. 4 comprises FIGS. 4A and 4B and shows a vertical cross-sectional view (A) and a horizontal cross-sectional down view taken at line B-B of FIG. 4A (B) of an apparatus for artificial weathering according to the present disclosure, the apparatus being of the static type with fixed samples.

DETAILED DESCRIPTION OF THE DRAWINGS

Figure 2:
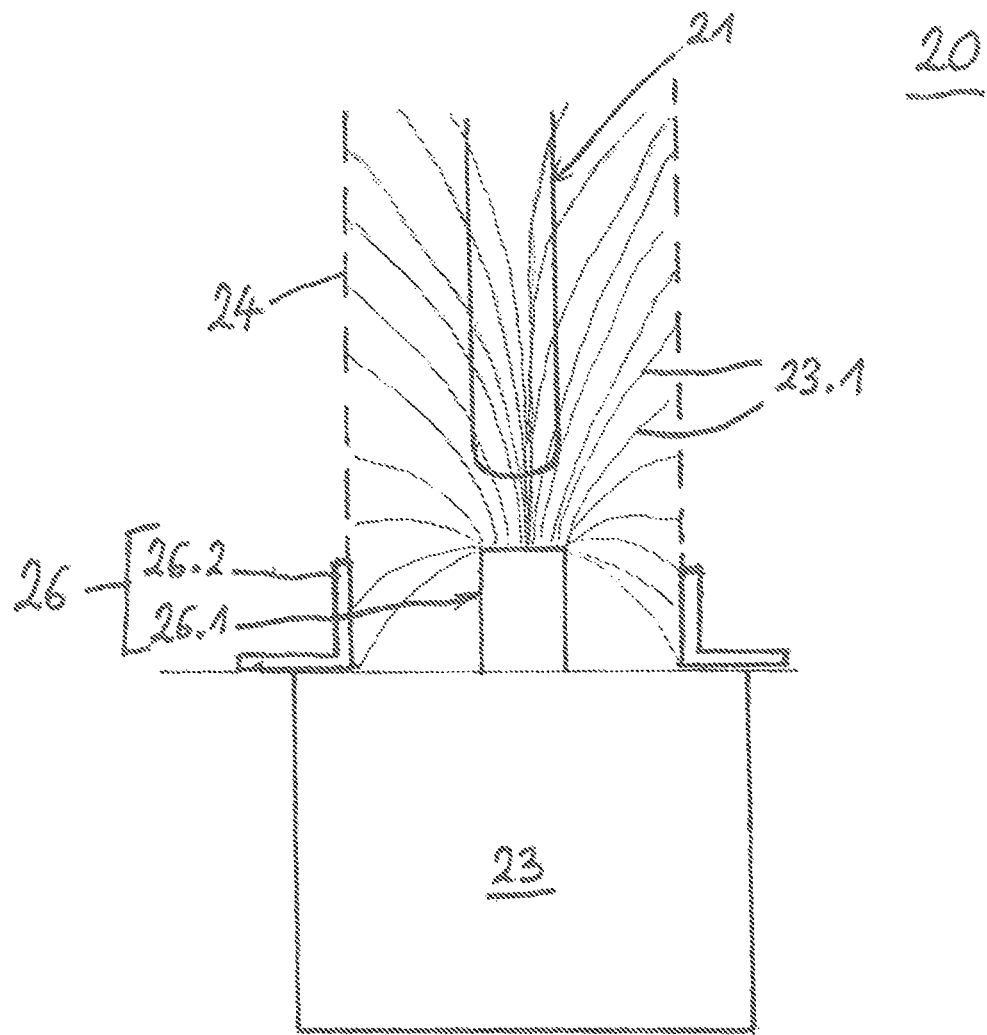
FIG. 2 shows a section of an example of a lamp assembly, which further comprises an electrically conductive enclosure surrounding the bulb.

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

In the following detailed description, reference is made to the accompanying drawings, in which are shown by way of illustration specific aspects in which the disclosure may be practiced. In this regard, directional terminology, such as "top", "bottom", "front", "back", etc. may be used with reference to the orientation of the figures being described. Since components of described devices may be positioned in a number of different orientations, the directional terminology may be used for purposes of illustration and is in no way limiting. Other aspects may be utilized and structural or logical changes may be made without departing from the concept of the present disclosure. Hence, the following detailed description is not to be taken in a limiting sense, and the concept of the present disclosure is defined by the appended claims.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements or layers co-operate or interact with each other regardless whether they are in direct physical or electrical contact, or they are not in direct contact with each other which means that there can be one or more intermediate elements disposed between them. Also, the term "exemplary" is merely meant as an example, rather than the best or optimal. The following detailed description, therefore, is not to be taken in a limiting sense, and the scope of the present disclosure is defined by the appended claims.

FIG. 1 comprises FIGS. 1A and 1B and shows an apparatus according to the present disclosure for the artificial weathering of samples.

The apparatus 100 of FIG. 1 comprises a weathering chamber 1 and a holding frame 2 which is mounted so that it can rotate in the weathering chamber 1. The holding frame 2 comprises a closed ring shape and samples 3 or workpieces can be held on appropriate holding platforms or sockets provided on the holding frame 2. The holding frame 2 can have, in particular, a cylindrical form and a circular lateral cross section as can be seen in FIG. 1B.

The apparatus 100 of FIG. 1 further comprises an electrodeless lamp 10 provided in the weathering chamber 1 and comprising a bulb 11 filled with a composition that emits light when in a plasma state, and a radio frequency source 12 being arranged so that it radiates a radio frequency field 13 into the bulb 11 to generate a luminous plasma for emitting a light radiation 15 comprising spectral emission characteristics equal or similar to natural solar radiation.

The electrodeless lamp 10 can be mounted so that its central axis falls together with the cylinder axis of the holding frame 2. Even more the holding frame 2 can be rotated so that the rotation axis coincides with its cylinder axis and with this central axis of the electrodeless lamp 10. As a result, when rotating the holding frame 2 the samples 3 move on a circular path around the electrodeless lamp 10 so that the distances between the samples 3 and the electrodeless lamp 10 are therefore at all times equal among themselves as well as constant in time.

In a manner which is known per se, the weathering chamber 1 may also have other artificial weathering instruments, for example moisture generators or the like, although these do not play an essential part in the present disclosure and will not therefore be discussed in detail. For example, an air flow may also be blown into the weathering chamber 1 and sweep past the samples 3 in a vertical direction.

As shown in the example of FIG. 1, the bulb 11 comprises a spherical form. However, the bulb can also have an elongate form comprising two opposing ends wherein the radio frequency source is arranged at one of the opposing ends.

The bulb 11 may be filled with a chemical composition that is suitable for producing light when it is ionized and heated to a plasma state. Several compositions can be used as fill in the frame of the present disclosure including, for example, Mercury, Sulphur, Selenium, Tellurium, metal halides and mixtures thereof, in an inert atmosphere. The composition may, for example, contain mercury together with one or more of the other mentioned components mentioned above. The composition may be such that it does not contain mercury alone. Moreover, the composition should be such that the radiation emitted by the lamp approximates the spectral characteristic of solar radiation. Otherwise the present disclosure is not limited to a particular chemical composition.

The bulb 11 may be realized by any kind of transparent material capable to withstand the high temperatures and internal pressures that are reached during the functioning of the lamp, and chemically compatible with the fill composition. In a typical realization the operating temperature of the bulb 11 will be in a range from 600° C. to 900° C., and the internal pressure at operation will be in a range from 0.1 MPa to 2 Mpa. For example, fused quartz (also fused silica, $SiO_2$) can be used as material for the bulb 11.

According to the desired power of the emitted radiation, the size of the bulb 11 may vary between 0.5 cm$^3$ and 100 cm$^3$, in particular between 10 cm$^3$ and 30 cm$^3$.

FIG. 1 shows only one electrodeless lamp in the weathering chamber. It is, however, also possible to arrange two or more lamps in the weathering chamber.

FIG. 2 shows a partial longitudinal sectional view of another example of an electrodeless lamp assembly to be used in a weathering apparatus.

As can be seen in FIG. 2, the electrodeless lamp 20 may further comprise an electrically conductive enclosure 24 surrounding the bulb 21. The electrically conductive enclosure 24 may be configured in the form of an electrically conductive mesh as it is indicated in FIG. 2. The enclosure 24 may surround the bulb 21 in such a way that the enclosure 24 comprises cylinder symmetry and a central longitudinal axis of the bulb 21 falls together with a central cylinder symmetry axis of the enclosure 24.

The enclosure 24 can also be realized in the form of a sheet of a suitable transparent, translucent, or light-transmitting substrate on which a thin and transparent electrically conductive layer is disposed.

A lateral diameter of the enclosure 24 can be in a range from 5 cm to 30 cm, and can in particular be constant over its entire length.

More specifically, the electrodeless lamp 20 as shown in FIG. 2 comprises a bulb 21 filled with a composition that emits light when in a plasma state. The electrodeless lamp 20 further comprises a radio frequency source 23 being arranged so as to radiate a radio frequency field 23.1 into the bulb 21 at its lower end. The radio frequency source 23 may be comprised of a magnetron emitting in the open 2.45 GHz band. The electrodeless lamp 20 further comprises a metallic mesh 24 which encloses the bulb 21 in such a way that both the bulb 21 and the mesh 24 are cylindrically symmetric having a common cylinder axis. The radio frequency source 23 comprises or is connected to a waveguide 26 which forms an output terminal for outputting the microwave radiation at the upper surface of the radio frequency source 23. The waveguide 26 is configured like a coaxial transmission line and comprises a central conductor 26.1 and an outer conductor 26.2 which surrounds the central conductor 26.1 in a sleeve-like manner. The lateral diameter of the waveguide 26 can be in a range from 5 cm to 30 cm, and the lateral diameter of the enclosure 24 can be the same as the lateral diameter of the waveguide 26. The lateral diameter of the central conductor 26.1 can be in a range from 1 cm to 10 cm, and can be essentially the same as the lateral diameter of the bulb 21. The length of the waveguide 26 can be in a range from 2 cm to 10 cm.

As shown in FIG. 2, the enclosure, in particular the mesh 24, can be connected to the outer sleeve-like conductor 26.2 of the waveguide 26 and thus comprises essentially the same lateral diameter. The mesh 24 has the function of confining the radio frequency field. No element is disposed between the upper surface of the central conductor 26.1 and the lower surface of the bulb 21.

Figure 3:
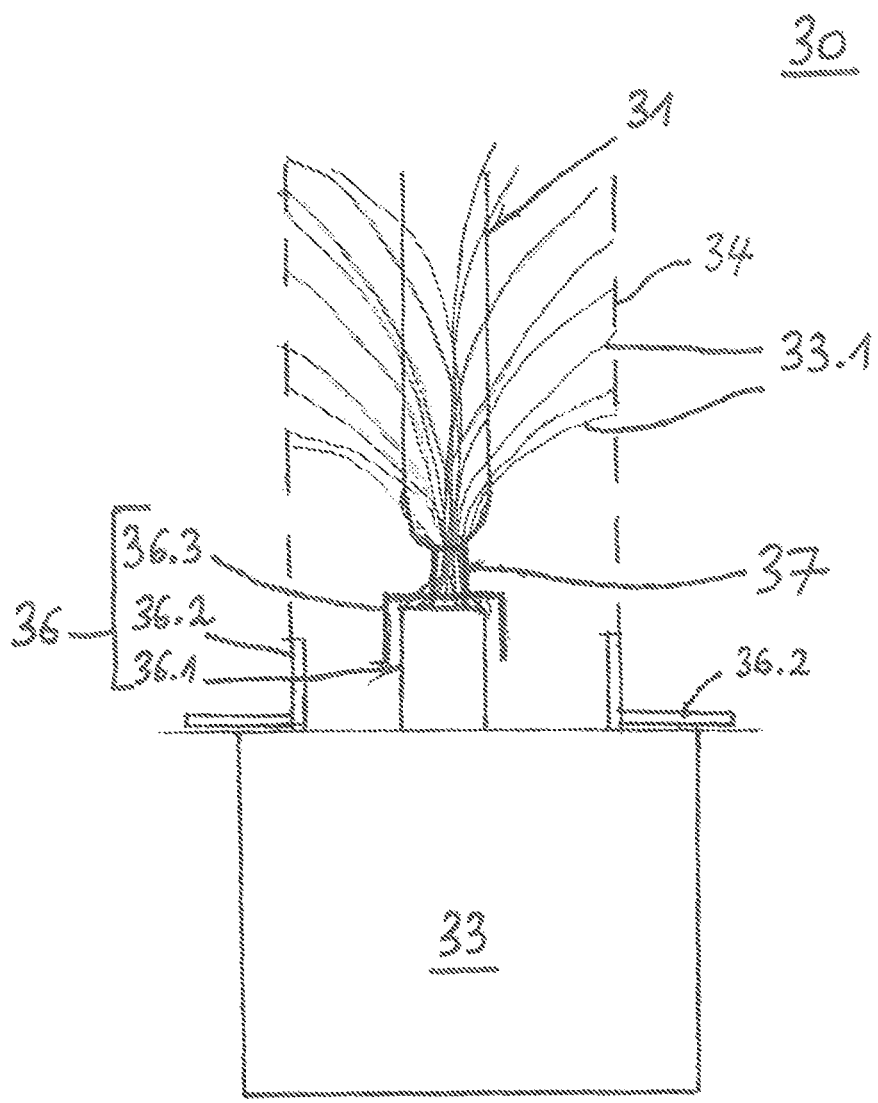
FIG. 3 shows a further example of a lamp assembly wherein a dielectric rod is connected between the central conductor and an outer wall of the bulb.

FIG. 3 shows a lower section of an electrodeless lamp 30 in a longitudinal sectional view.

The electrodeless lamp 30 as shown in FIG. 3 comprises a bulb 31, a radio frequency source 32, a metallic mesh 34, and a waveguide 36, all of these elements being configured in the same manner as with the electrodeless lamp 20 of FIG. 2. As an additional element, however, a dielectric rod 37 is disposed between the central conductor 36.1 of the waveguide 36 and the bulb 31. The waveguide 36 may comprise a metallic cup 36.3 which covers the central conductor 36.1 and which comprises a central opening in its upper surface in which opening the dielectric rod 37 is inserted. The dielectric rod 37 extends either from the opening or from an upper surface of the central conductor 36.1 through the opening to the lower surface of the outer wall of the bulb 36.1. In this way the electric field is nearly completely guided through the dielectric rod 37 and the dielectric rod 37 acts as a dielectric waveguide and channels the microwave energy directly into the inner volume of the bulb 31. Accordingly, as indicated by the field lines 33.1 of the electric field, the channeling of the electric field into the bulb 31 may be improved as compared with the electrodeless lamp 20 of FIG. 2.

In both examples of electrodeless lamps of FIGS. 2 and 3 the radio frequency source was shown to be arranged completely outside the bulb and to radiate the radio frequency field from outside into the bulb. However, it is also possible to integrate at least a part of the radio frequency source into the bulb as, for example, by inserting the central conductor into the bulb through an opening of a wall of the bulb.

Starting the electrodeless lamp such as that shown and described in connection with either one of FIGS. 1 to 3, may be done in two steps. At the beginning, when starting the lamp, due to Paschen law, there is a discharge at a low pressure inside the bulb that produces UV light. This discharge contains principally the rare gas present in the bulb. The rest of the active materials is still at solid or liquid state. This discharge then heats these other active materials. The discharge is constituted of low ionized molecules and the temperature is still too low to obtain ionized molecules. When a certain level of temperature is reached inside the bulb, the rest of active material will be evaporated. At this moment, these materials are mixed inside the discharge. The discharge changes its behavior and switches to a thermal plasma. At this moment, the impedance of the discharge changes to match with the rest of the system. The reflection of the microwave radiation is considerably reduced and the power can be transmitted to the discharge to produce a lot of light. The composition of the discharge is completely different in comparison with the discharge at the beginning (during the first 10-15 seconds), the molecules evaporated are now in the majority, and the molecules of rare gas used to initiate the discharge are in the minority (less 1%).

FIG. 4 comprises FIGS. 4A and 4B and shows an example of an artificial weathering device of the static type with fixed samples.

The apparatus 200 for artificial weathering as shown in FIG. 4 comprises a weathering chamber 201 which is configured so that a plurality of samples 3 or work-pieces can be arranged on a bottom surface of the weathering chamber 201. The apparatus 200 of FIG. 4 further comprises an electrodeless lamp 210 provided in the weathering chamber 201 and comprising a bulb 211 filled with a composition that emits light when in a plasma state, and a radio frequency source 212 being arranged so that it radiates a radio frequency field 213 into the bulb 211 to generate a luminous plasma for emitting a light radiation 215 comprising spectral emission characteristics similar to natural solar radiation.

The electrodeless lamp 210 further comprises a light concentrator 214 which concentrates the light generated in the bulb 211 into a beam of a desired aperture which may then be directed in a desired manner onto specific samples to be examined. In the example of FIG. 4 the light concentrator 214 is formed of a cone shaped light reflector 214 which comprises reflective inner walls to collect as much of the light emitted by the bulb 211 and direct it onto the samples 203 as indicated by the arrows.

Otherwise the apparatus 200 and the electrodeless lamp 210 may comprise any feature that was described above in connection with the apparatus 100 of FIG. 1 or the electrodeless lamps of FIGS. 2 and 3.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the concept of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

The invention claimed is:

1. An apparatus for artificial weathering or lightfastness testing of samples or for simulating solar radiation, the apparatus comprising:
    a weathering chamber; and
    an electrodeless lamp provided in the weathering chamber and comprising:
        a bulb filled with a composition that emits light when in a plasma state;
        a radio frequency source being arranged so that the radio frequency source radiates a radio frequency field into the bulb to generate a luminous plasma for emitting a radiation comprising spectral emission characteristics similar or equal to natural solar radiation; and
        an electrically conductive enclosure surrounding the bulb, wherein:
            the radio frequency source is connected with a waveguide configured to guide a radio frequency wave,
            the electrically conductive enclosure is connected to the waveguide,
            the waveguide comprises a central conductor and an outer sleeve-like conductor surrounding the central conductor, and
            both the central conductor and the outer sleeve-like conductor extend from a main surface of the radio frequency source in a direction of the bulb.

2. The apparatus according to claim 1, wherein:
the bulb is filled by a gas comprising one or more of Mercury, Sulphur, Selenium, Tellurium, metal halides, or one or more other elements or compounds.

3. The apparatus according to claim 2, wherein:
the gas comprises Mercury and one or more of Sulphur, Selenium, Tellurium, metal halides, or one or more other elements or compounds.

4. The apparatus according to claim 2, wherein:
the gas does not comprise Mercury alone.

5. The apparatus according to claim 2, wherein:
the gas is provided in an inert atmosphere.

6. The apparatus according to claim 1, wherein:
the electrically conductive enclosure is connected with the outer sleeve-like conductor.

7. The apparatus according to claim 1, further comprising:
a dielectric rod connected between a surface of the central conductor and an outer wall of the bulb.

8. The apparatus according to claim 1, further comprising:
a light concentrator in which the electrodeless lamp is disposed.

9. The apparatus according to claim 8, wherein:
the light concentrator comprises reflective walls in order to concentrate the light generated in the bulb into a beam of a desired aperture.

10. The apparatus according to claim 1, wherein:
the apparatus is configured to rotate the samples around the electrodeless lamp.

11. The apparatus according to claim 1, wherein:
the apparatus is configured to arrange the samples in a stationary manner.

12. The apparatus according to claim 1, wherein:
the electrodeless lamp is arranged in such a way within the apparatus that at least a portion of the light emitted by the bulb falls directly onto the samples.

* * * * *